Patented Nov. 9, 1937

2,098,551

UNITED STATES PATENT OFFICE 2,098,551

REACTION PRODUCT OF AN ESTER-LIKE WAX AND A BASE

Ludwig Orthner, Leverkusen I. G. Werk, and Helmut Keppler, Leverkusen-Schlebusch, Germany, assignors to General Aniline Works, Inc., New York, N. Y., a corporation of Delaware No Drawing. Application February 23, 1933, Serial No. 658,268. In Germany March 3, 1932

15 Claims. (Cl. 260—124)

The present invention relates to new products obtainable from natural or synthetic ester-like waxes by conversion with such amines which possess at least one movable hydrogen atom connected to the nitrogen atom. By the term "ester-like waxes" as used in the specification and the annexed claims, such waxes are understood which chemically are esters and, therefore, are capable of being saponified. Mixtures are formed of carboxylic acid amides with the higher molecular alcohols having been linked to the carbonic acids in the original wax; also those constituents of wax which cannot be aminolyzed are present in the mixtures. The aforesaid carboxylic acid amides correspond to the general formula:

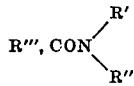

wherein R''' means the hydrocarbon chain of the carboxylic acid contained in an ester-like form in the original wax, R' and R'' stand for hydrogen, alkyl, aralkyl, cycloalkyl, aryl, wherein the organic radicles may be substituted by hydroxyl- or amino-groups.

The preparation of the new wax products is carried out by heating the amines with the waxes, whereby the quantity of base, which is calculated from the ester number of the wax or an excess thereof may be applied. By using a quantity of base, being less than the theoretical amount, only a part of the higher molecular carboxylic acids esterified in the wax can be transformed into amides; even such products are capable of being applied in various manners.

The quantity of base used for the conversion may be added all at one time or in portions or in a measure proportionate to its consumption in the reaction. If the boiling point of the base used for the conversion lies below the reaction temperature one preferably works under a reflux condenser or in a closed vessel. When gaseous or easily volatile bases are employed, a raised pressure should be used; advantageously the base is circulated in a closed apparatus, and the consumed portions are substituted by the addition of new quantities of base. The reaction may be accelerated by catalyzers such as, for instance, copper, nickel, cobalt or metal oxides or salts respectively. It is practical to work in the absence of water, that is to say, even technical bases or mixtures of bases with a small water content can be used. If the reaction components do not mix or only with difficulty, it is advantageous to stir during the reaction. In the reaction indifferent solvents or diluents may also be present.

The products thus obtained are distinguished from the waxes by their increased dispersing capacity in water and by their greater reacting capacity in chemical conversions. If the swelling- or dispersing capacity in water is not sufficient, the hydrophile character of the conversion products can be increased. This is accomplished according to the invention by introducing hydrophile groups into such constituents of the aminolyzed products which contain the

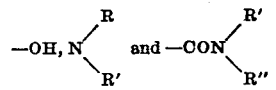

radicles, wherein R and R' denote hydrogen, alkyl, cycloalkyl, aralkyl, aryl, hydroxyalkyl, R'' means hydrogen or hydroxyalkyl by the aid of a complete or partial alkylation, acylation or salt formation with acids; such hydrophile groups are, for instance, carbohydroxyl groups —(CHOH)$_x$—, polyglycolether groups —(C$_2$H$_4$O)$_x$—, sulfonic ester groups —OSO$_3$H, sulfonic acid groups —SO$_3$H, dithiocarbonic acid groups —CS$_2$H, ammonium groups of the formula:

wherein X means a basic inorganic acid residue and at least one of the substituents R$_1$, R$_2$, R$_3$ may stand for hydrogen, while the remaining ones may denote alkyl, aralkyl, cycloalkyl, aryl groups. Even several of the aforesaid operations are subsequently carried out with the same material; these conversions also may be executed in the presence of indifferent or reactive compounds such as, for instance, water, aliphatic and aromatic, saturated or unsaturated hydrocarbons, alcohols, ketones, inorganic or organic acids or the derivatives thereof etc.

For such operations the following examples may be mentioned:

Aminolyzed products from waxes can be converted with unsubstituted or substituted alkylene oxides or with halogenated hydrines, for instance, with ethylene oxide, glycide, epichlorohydrine, glycolchlorohydrine, glycerine-mono- and dichlorohydrine, polyglycerinechlorohydrine.

Several of these compounds can also be rendered more hydrophile by condensation with aldoses or ketoses such as, for instance, glucose, mannose, maltose etc. Aminolyzed products containing basic groups may be peralkylated or transformed into salts with inorganic or organic acids.

Furthermore, the dispersing capacity or the solubility in water of the wax-aminolyzed products or the conversion products thereof with alkylene oxides and/or with halogenated hydrines or with other substances containing hydroxyl groups may be raised by converting these substances with inorganic polybasic acids such as sulfuric acid, phosphoric acid, carbonic acid, dithiocarbonic acid or their derivatives such as, for instance, chlorides, anhydrides, esters, amides. The above-mentioned aminolyzed substances can also be acylated with sulfonic acids or hydrocarbonic acids, for instance, with sulfoacetic acid, sulfophthalic acid, lactic acid, salicylic acid, glyconic acid etc., or they may be alkylated with sulfonic acids, containing reactive groups, for instance, with chloroethansulfonic acid, vinylsulfonic acid, acetaldehydsulfonic acid, benzaldehydsulfonic acid etc. If new hydroxyl-, amino- or carboxylic groups are introduced by these latter operations, they can further be converted again, according to the invention, for instance, they may be oxyalkylated or peralkylated or acylated with polybasic inorganic acids etc. The substances, thus obtained, having an acid character, may be applied as such or in the form of their salts with inorganic or organic bases.

Moreover, by a corresponding choice of the alkylating- and acylating agents as well as of the reaction conditions the diluents containing amino- or carboxylic acid hydroxyalkyl amide groups, may be converted for themselves, for instance, with alkylene oxides, peralkylating agents, halogenated alkylsulfonic acids or with polybasic mineral acids etc. In this manner valuable mixtures are obtained.

Even several of the aforesaid operations may be carried out with the same material. The aminolysis product from the wax may be oxyalkylated at first and then sulfonated. An aminolysis product prepared from wax and alkylenepolyamines, may be converted with chloroethane-sulfonic acid at first and then peralkylated or a mixture obtained by the reaction of diethanolamine upon wax, may be treated with aldehydes and halogenated hydrogen and the alkylated product containing halogen is then converted with sulfite or thiosulfate into a sulfonic acid. The aforesaid reactions may be carried out in the presence of indifferent or reactive compounds, for instance, in the case of aminolysis products containing amino- or hydroxyalkyl amide groups, the reaction may be carried out with alkylene oxides in the presence of water; there result mixtures of partially other properties than in the case of the conversion in the absence of water. The sulfonation of a wax aminolysis product prepared with ethanolamine can be carried out in the presence of aromatic hydrocarbons or phenols. The products thus obtained are more resistant to hydrolyzing agents than the sulfonation products prepared from the above mixture without this addition.

The new products obtainable in accordance with the process of the present invention possess—according to the kind of the used wax or amine- wax-like, pasty, salvy or oily properties. The salts from some of the obtained products with acid action and from inorganic bases are solid, crumbly masses. The shades of the products depend by far on that of the starting materials; in the case of dark colored substances a clarification can be obtained by treating with oxidizing agents such as peroxides, hypochlorites and/or by treating with adsorbing agents such as decolorizing carbon, fuller's earth.

The new products are more easily soluble or more dispersive in water than the starting materials. As any grade of solubility, swelling- or dispersing capacity in water or in organic solvents may be obtained by a suitable choice of the reaction components as well as of the proportions, a suitable grade of solubility can be prepared for any purpose. Many substances of this group of compounds may be applied, where difficulties occur through the hardness of natural water on using common soaps for replacing these soaps or for transforming insoluble soaps produced with hard water, into a harmless form by dissolving or dispersing.

The substances of this group of new compounds, being more soluble in water, are suitable as addition products to the liquors for the treatment of textiles, for instance, in washing, dyeing, after-treating, bucking, mercerizing, carbonizing and fulling in order to raise the cleansing-, wetting-, dispersing-, emulsifying-, equalizing- and dyeing capacity, further, to improve the fastness of dyeings to rubbing and to stabilize diazo solutions. They can also be used as solvents and agents for the preparation of a paste, furthermore, as emulsifying agents, for instance, for oils, fats and hydrocarbons. The substances of this group, which are sufficiently soluble in lipoids, may be employed in the preparation of meltings, sizes, finishings and as softening agents for textiles, furthermore, for the production of salves, cosmetical and pharmaceutical preparations, greasing agents, stuffing agents, consistent fats, cutting- or bore oils, polishing masses, agents for protecting the surface of metals and as addition products to lacquers, varnishes and caoutchouc.

The said substances can be used as such or in mixture with each other or with unchanged starting material or together with cleaning-, wetting-, dispersing-agents and solvents which are improved as to their effect by the new products or which eventually serve to bring the conversion products into a form suitable for the application. As such addition products there come into question, for instance, fatty acid soaps, Turkey red oils, mineral oil and fatty alcohol sulfonates, condensation products of higher fatty-naphthene and resin acids with hydroxy- and aminoalkyl-sulfonic acids, alkylated naphthalenesulfonic acids, albuminous substances, their decomposition products or derivatives or conversion products, respectively, sulfite liquor, water-soluble gums, mucilage, alcohols, ketones, hydrocarbons, or halogenated hydrocarbons etc. or mixtures of these substances. Even lipolytical- proteolytical and enzymes which are capable of decomposing carbohydrates; furthermore, inorganic substances such as soda, Glauber's salt, soluble phosphates, borates etc. come into consideration as addition products.

As starting materials for the said conversions there come into question natural waxes, such as carnauba wax, beeswax, woolfat, sperm oil, etc. Furthermore, such ester-like waxes can aminolytically split up, as they can be obtained in the catalytical reduction of higher molecular fatty acids or also in the oxidation of paraffin-hydrocarbons. The waxes can also be used for the aminolysis as such or together with glycerides, fatty acids or higher molecular alcohols.

Besides ammonia there can be used as bases primary or secondary aliphatic, cycloaliphatic, aromatic-aliphatic or aromatic amines such methylamine, amino-propandiol, butylamine, undecylamine, benzylamine, ethanolamine, cyclohexylamine, aniline, toluidine, naphthylamine, phenylenediamine, ethylenediamine, polyalkylene-polyamines, dibutylamine, dibenzylamine, dicyclohexylamine, diethanolamine, dipropandiolamine, methylaniline, piperidine, etc.

The following examples serve to illustrate our invention but without limiting it thereto. The parts are by weight.

*Example 1.*—200 parts of beeswax are treated with ammonia in an autoclave provided with a stirrer at a temperature of about 150 to 160° C. for 5 to 6 hours. The ammonia consumed in the reaction is permanently substituted from an ammonia bomb directly connected with the autoclave. In consequence of its higher dispersive capability in water the product thus obtained can preferably be used for the preparation of wax-creams and wax-emulsions.

*Example 2.*—228 parts of sperm oil are heated with 35 parts of a technical ethanolamine, having a water content of 8%, to 140–150° C. for 10 hours, while stirring. The aminolysis of the sperm oil amounts to about 78%. The reaction product is a salvy mass, being insoluble in water and soluble in many organic solvents. The substance possesses a good dispersing capacity for fatty oils, it is also able to disperse large quantities of water in paraffin, hydrocarbons, while forming salves.

*Example 3.*—26 parts of the conversion product from sperm oil with ethanolamine, obtained according to Example 2, are dissolved in 75 parts of carbon tetrachloride; a mixture of 15 parts of monohydrate and 3 parts of chlorosulfonic acid are gradually added to this solution at a temperature of about 30 to 35° C., while stirring. After some time the mass is forced, while stirring, into 45 parts of a caustic soda lye of 40° Bé., while the temperature is maintained at 70° C. The base thus obtained is neutralized with sulfuric acid and the carbon tetrachloride is distilled off. A weakly colored rather thinly liquid mass easily soluble in water is obtained.

The product can be used as purifying-, wetting-, and equalizing agent and as softening agent for textiles; it possesses a good dispersing capacity for insoluble calcium soaps, dyestuffs or their preliminary products.

By the treatment of the solution of the starting material in carbon tetrachloride or in sulfuric acid with chlorine there are obtained products which are suitable as weighting agents for fabrics.

If the conversion product from sperm oil and ethanolamine is converted before the sulfonation with 15 to 50 percent by weight of ethylene oxide, or if the sulfonation is carried out in the presence of naphthalene, products of a high resistance to hydrolyzing agents and of partially improved effect are obtained. In the same manner woolfat or mixtures of sperm oil with woolfat, eventually together with glycerides such as coconut oil, palm oil, soya bean oil, cottonseed oil, etc. can be used as starting materials for the conversions above-mentioned. Instead of the monoethanolamine there may be employed diethanolamine, 1-amino-2,3-propandiol or the corresponding secondary amine, furthermore, ammonia, primary or secondary alkylaniline. If the conversion of the waxes or of the mixtures of wax and glyceride is carried out with ammonia, it is advantageous to add alkylene oxide before the sulfonation. In all these cases products with capillary activity are obtained.

Instead of the sulfuric acid there can be used phosphoric acid, pyrophosphoric acid or their derivatives such as anhydrides, chlorites with such wax derivatives which contain OH-groups, whereby products can be obtained which can be used for stabilizing solutions containing peroxide.

*Example 4.*—Woolfat is treated in an autoclave in the presence of copper, or a small quantity of copper salt with ammonia under a pressure of 6–12 atmospheres, while stirring, at a temperature of 150–200° C.; the ammonia is substituted from a bomb connected with the autoclave in proportion with its consumption in the reaction.

The dark colored wax-like product is stirred with a small quantity of hypochlorite, while heating, until the desired clarification is reached. The molten product can be filtered off from insoluble constituents and adhering moisture is removed by evaporation.

The substance thus obtained is a yellowish wax-like mass, which can more easily be dispersed or emulsified in water than the woolfat. It can be used for the preparation of salves, creams, stuffing and impregnating agents, meltings etc.

Instead of ammonia primary or secondary alkylolamines can also be used for the conversion of the woolfat.

*Example 5.*—350 parts of woolfat are heated with 27 parts of a technical ethanolamine having a water content of 4%, while stirring sometimes, at the reflux condenser for 10 hours to a temperature of about 100 to 170° C. The reaction product is insoluble in water, easily soluble in carbon tetrachloride.

Instead of the monoethanolamine also other primary or secondary alkylolamines may be employed.

78 parts of the raw conversion product are converted with 111 parts of ethylene oxide with the addition of some aqueous alkali in a pressure vessel at about 60 to 100° C. A butter-like mass is thus obtained which is comparatively easily dispersed in water; with small quantities of water emulsions are obtained which give rather clear and foaming solutions, when strongly diluted. The dilute solutions are well consistent with calcium salts. The product can be used for the preparation of oleic acid emulsions.

If 100 parts of ethylene oxide or the corresponding quantity of propylene oxide are introduced at a temperature of about 130 to 150° C. into 100 parts of the molten conversion product of woolfat and ethanolamine in the presence of caustic alkali or alkali-alcoholate, wax-like products are obtained. These can serve—if desired after the clarification and with the application of easily water-soluble dispersing agents— for the manufacture of dispersions or solutions which can be used as softening agents for textiles especially for artificial silk.

These products can also be added to spinning solutions for artificial fabrics, for instance, for copper silk, whereby the freshly spun fabric obtains a soft, agreeable touch.

If 100 parts of a conversion product from sperm oil and ethanolamine, prepared according to Example 2, are converted in the presence of caustic alkali with 100 to 200 parts of ethylene oxide, oily products are obtained which give with water weakly turbid, slimy or opalescent solutions according to the dilution. The products are suitable—if desired together with organic solvents such as carbon tetrachloride—as emulsifying agents for fatty acids or mineral oils.

*Example 6.*—Woolfat or sperm oil is converted with ammonia, primary or secondary alkylolamines as described in Examples 4 or 5. The mixtures thus obtained are treated with one and a half to three times the quantity of ethylene oxide as described in Example 5. Oily products are obtained which easily dissolve in water. The new substances are good emulsifying, equalizing, and dispersing agents, they can also be applied for the stabilization of the diazo solutions.

*Example 7.*—150 parts of a wax obtained by a catalytical reduction of soya bean oil—which consists of octadecylstearate, free stearinic acid, and some glyceride—are heated with 40 to 100 parts of a basic mixture obtained by the reaction of ethylene oxide upon ammonia under pressure,—consisting of alkylene-polyamines—for several hours to a temperature of about 120 to 160° C., if desired while stirring. The products thus obtained can be set free—if desired already during the reaction—from non-converted amines by distillation in vacuo; wax-like substances are obtained which give with water turbid or opalescent solutions in the presence of acids. The conversion products prepared with the higher quantities of base give already without the addition of an acid with water—according to the degree of dilution—colloid-dispersive, slimy opalescent solutions. Solutions of the said products in fats give very resistant and fine solutions in water which has been made weakly acid. By the treatment with alkylating agents, for instance, dialkylsulfates, alkyl halide, diazomethane etc. wax-like masses are obtained from the aminolysis products which give with water solutions resistant to acid, calcium and alkali; these compounds may be used as emulsifying, dispersing, equalizing agents and for impregnating artificial silk.

If halogenated hydrines, for instance, glycol- or glycerine-chloro-hydrines are employed for the alkylation, wax-like products are obtained again, which can be used as emulsifying agents. By alkylation with alkylene oxides, for instance, with ethylene oxide, propylene oxide etc. in the presence of some water or alkali there are obtained—according to the quantity of the added alkylene oxide—more or less colloid-soluble mixture being easily dispersed in water. These can be used—according to their solubility—as softening agents, emulsifying agents, as additions to spinning solutions or as purifying, dispersing, equalizing and wetting agents.

Other waxes, for instance, woolfat, sperm oil, can also be used for said conversions instead of the waxes mentioned above.

*Example 8.*—A conversion product prepared from woolfat and primary or secondary alkylolamines, for instance, mono- or di-ethanolamine or technical mixtures thereof is wholly or partially transformed into salts of the dithiocarbonic acid by the treatment with alkali and carbon disulfide. Instead of the aforesaid starting materials also other conversion products of the woolfat can be used, the chief constituents of which contain hydroxyl or amino groups, for instance, the conversion products obtained from woolfat and the polyalkylene-polyamine mixture mentioned in Example 7, or the reaction products from the alkylene oxides upon the conversion products obtained from woolfat and ammonia or primary or secondary alkylolamines.

Instead of the wool fat any other ester-like waxes can be used such as sperm oil, synthetical waxes etc. The products thus obtained give— according to the step of the transformation into xanthogenates—turbid or clear dispersions or solutions in alkaline baths. The substances may be used as softening agents for vegetable fibers, for instance, as addition products to spinning solutions of viscose silk, furthermore, as flotation agents for ores of the type of sulfides, as additions to bucking dye baths or mercerizing dye baths, as dispersing and equalizing agents for vat dyes or for naphthols, as purifying and wetting agents in alkaline dye baths and so on.

*Example 9.*—180 parts of a conversion product prepared according to Example 7 from 100 parts of the synthetical wax mentioned therein, and from 50 to 60 parts of a mixture of polyalkylene-polyamine, purified by distillation in vacuo or by washing in a solution of electrolytes and by a subsequent dry melting are stirred with 80–100 parts of an 80% chloro-ethanesulfonic acid sodium, being free from water, at a temperature of about 100 to 150° C. for several hours. A wax-like product is obtained which can be purified by stirring with a hot salt solution and removing the brine. The product thus obtained gives with water—according to the dilution—turbid to opalescent foaming solutions, which are not precipitated by the addition of some soda or caustic soda lye. The product is very suitable as emulsifying and purifying agent, as a softening agent for textiles, for the improvement of the water-proofness of dyeings with directly drawing dyestuffs.

The proportions of the materials used for the manufacture of the aforesaid product i. e. of the wax, of the mixture of amines and of the chloroethanesulfonic acid salt can vary in wide limits; mode of the manufacture can also be varied, for instance, by omitting the distillation in vacuo, or the washing with salt solution.

The substances obtained by a partial or complete conversion with chloroethanesulfonic acid of the primary or secondary amino groups of the wax product can be subjected to further reactions, for instance, to the treatment with alkylating or oxyalkylating agents, for instance, with dimethylsulfate or with alkylene-oxide or with acylating agents, for instance, with acetic acid anhydride, sulfuric acid, chlorosulfonic acid etc. Several of the products thus obtained are in some respects even more effective and can be used in the same way as substances which are not after-treated.

Instead of the described after-treatment with alkylated or acylated agents the wax-like products obtainable with chloro-ethane-sulfonic acid according to this example—preferably in the presence of fixed alkali—can be subjected to a distillation in vacuo or to an extraction with organic solvents such as ether, carbon tetrachloride etc. Easily water-soluble products are obtained which have good foaming, washing, wetting, dispersing and equalizing properties.

Instead of the chloroethanesulfonic acid other organic sulfonic acids can be used for the said conversions, which contain a reactive group in the organic radicle such as, for instance, the benzylchloride-, the β-chloroxypropane-, the vinylsulfonic acid. Furthermore, any ester-like waxes and polyvalent amines can be employed as starting materials.

*Example 10.*—30 parts of a conversion product prepared from sperm oil and diethanolamine according to Example 2 and washed with a salt solution are heated with 15–18 parts of a 75% benzylaldehydesulfonic acid sodium salt and about 6–7 parts of a 75% sulfuric acid to a temperature of about 30 to 50° C. for several hours, while stirring. 30–50 parts of water are added thereto, the stirrer is stopped, and the reaction mass is allowed to settle while hot; the removed fat layer is neutralized with caustic soda lye. The product thus obtained dissolves in water and can be used as wetting and softening agent.

Instead of the benzaldehydesulfonic acid acetaldehydedisulfonic acid or keton-sulfonic acids, for instance, acetone-sulfonic acid can be used.

*Example 11.*—30 parts of the conversion product from sperm oil and ethanolamine mentioned in Example 10 are heated with 20 parts of the sodium salt of the sulfonacetic acid-ethyl ester— eventually in the presence of toluene and xylene—to a temperature of about 100–130° C., while stirring, whereby the diluent, eventually added, can finally be distilled off in vacuo.

The product thus obtained dissolves in water; it can be used as softening, emulsifying, dispersing agents etc.

Instead of the sodium salt of the sulfoacetic-ethyl ester also the acid sodium salt

NaO₃SCH₃COOH or the mono-sodium salt of the sulfopalmitic acid can be employed. Instead of using ethanolamine for the manufacture of the starting material for the said conversion also diethanolamine or 1-amino-2.3-dipropandiol or the corresponding amine can be used and instead of the sperm oil also another ester-like wax may be applied.

We claim:

1. The process which comprises reacting upon a natural or synthetic ester-like wax with a base selected from the group consisting of ammonia, primary and secondary aliphatic, cycloaliphatic, araliphatic and aromatic amines, polyalkylene-polyamines containing at least one hydrogen atom connected to a nitrogen atom, and piperidine, and treating the resulting compounds with an agent raising their hydrotropical properties selected from the group consisting of salifying, alkylating and acylating agents.

2. The process which comprises reacting upon a natural or synthetic ester-like wax with a base selected from the group consisting of ammonia, primary and secondary aliphatic, cycloaliphatic, araliphatic and aromatic amines, polyalkylene-polyamines containing at least one hydrogen atom connected to a nitrogen atom, and piperidine, and then raising the hydrotropical properties of the resulting compounds, by acylating with the aid of a polybasic inorganic acid.

3. The process which comprises reacting upon a natural or synthetic ester-like wax with a base selected from the group consisting of ammonia, primary and secondary aliphatic, cycloaliphatic, araliphatic and aromatic amines, polyalkylene-polyamines containing at least one hydrogen atom connected to a nitrogen atom, and piperidine, and then raising the hydrotropical properties of the resulting compounds, by condensing with an alkylene oxide.

4. The process which comprises reacting upon a natural or synthetic ester-like wax with a polyalkylene-polyamine containing at least one hydrogen atom connected to a nitrogen atom and then raising the hydrotropical properties of the resulting compounds which contain basic radicles by a treatment with an alkylating agent.

5. The process which comprises reacting upon sperm oil with an ethylene polyamine mixture obtainable by heating ammonia and ethylene chloride under pressure, and then salifying the resulting product with an acid.

6. The composition of matter which comprises as an essential ingredient a reaction product obtainable by reacting upon a natural or synthetic ester-like wax with a nitrogenous base selected from the group consisting of ammonia, primary and secondary aliphatic, cycloaliphatic, araliphatic and aromatic amines, polyalkylene-polyamines containing at least one hydrogen atom connected to a nitrogen atom, and piperidine, and treating the resulting compounds with an agent raising their hydrotropical properties selected from the group consisting of salifying, alkylating and acylating agents, the said reaction products being wax-like substances which are easily soluble, or easily dispersed in water and having good properties as dispersing, softening, sizing, greasing, finishing, impregnating, cleansing, wetting, washing, foaming and equalizing agents.

7. The composition of matter which comprises as an essential ingredient a reaction product obtainable by reacting upon a natural or synthetic ester-like wax with a nitrogenous base selected from the group consisting of ammonia, primary and secondary aliphatic, cycloaliphatic, araliphatic and aromatic amines, polyalkylene-polyamines containing at least one hydrogen atom connected to a nitrogen atom, and piperidine, and then raising the hydrotropical properties of the components, by acylating with the aid of a polybasic inorganic acid, which products are soluble in water and represent in the form of their alkaline salts wax-like substances having good properties as softening, emulsifying, cleansing, wetting, washing, foaming and equalizing agents.

8. The composition of matter which comprises as an essential ingredient a reaction product obtainable by reacting upon a natural or synthetic ester-like wax with a nitrogenous base selected from the group consisting of ammonia, primary and secondary aliphatic, cycloaliphatic, araliphatic and aromatic amines, polyalkylene-polyamines containing at least one hydrogen atom connected to a nitrogen atom, and piperidine, and then raising the hydrotropical properties of the components, by condensing with an alkylene oxide; said reaction products represent wax-like, salvy or oily substances being soluble or easily dispersed in water and having good properties as softening, emulsifying, cleansing, wetting, foaming and equalizing agents.

9. The composition of matter which comprises as an essential ingredient a reaction product obtainable by reacting upon a natural or synthetic ester-like wax with a nitrogenous base selected from the group consisting of ammonia, primary and secondary aliphatic, cycloaliphatic, araliphatic and aromatic amines, polyalkylene-polyamines containing at least one hydrogen atom connected to a nitrogen atom, and piperidine, and then raising the hydrotropical properties of the components, which contain basic radicles, by a treatment with an alkylating agent; said reaction products representing wax-like, salvy or oily substances being soluble or easily dispersed in water and having good properties as softening, emulsifying, cleansing, wetting, foaming and equalizing agents.

10. The composition of matter which comprises as an essential ingredient the reaction product of sperm oil and an ethylene polyamine mixture obtainable by heating ammonia and ethylene chloride under pressure; said product being a wax-like substance which swells when heated in water and yields with acids clear and foaming solutions, which possess a good emulsifying capacity for fats and oils.

11. The composition of matter comprising as essential ingredients the substances obtainable by treating the reaction product of an animal ester-like wax and a technical hydroxyalkylamine of low molecular weight containing at least one hydrogen atom connected to the nitrogen atom, with ethylene oxide; said substances being wax-like, salvy or oily products, soluble or easily dispersed in water and having good properties as softening, emulsifying, cleansing, wetting, foaming and equalizing agents.

12. The composition of matter comprising as essential ingredients the substances obtainable by firstly treating the reaction product of an animal ester-like wax and a technical hydroxyalkylamine of low molecular weight containing at least one hydrogen atom connected to the nitrogen atom, with ethylene oxide, and thereupon sulfonating the same, which substances are soluble in water and represent in the form of their alkaline salts wax-like substances having good properties as softening, emulsifying, cleansing, wetting, washing, foaming and equalizing agents.

13. The composition of matter comprising as essential ingredients the substances obtainable by firstly treating the reaction product of an animal ester-like wax and a technical hydroxyalkylamine of low molecular weight containing at least one hydrogen atom connected to the nitrogen atom with 15-50% by weight of ethylene oxide and thereupon sulfonating the same, which substances are soluble in water and represent in the form of their alkaline salts wax-like substances, having good properties as softening, emulsifying, cleansing, wetting, washing, foaming and equalizing agents.

14. The process which comprises reacting upon a natural or synthetic ester-like wax with a base selected from the group consisting of ammonia, primary and secondary aliphatic, cycloaliphatic, araliphatic and aromatic amines, polyalkylenepolyamines containing at least one hydrogen atom connected to a nitrogen atom, and piperidine, and then raising the hydrotropical properties of the resulting compounds by condensing the same with a derivative of an aliphatic polyhydric alcohol of the group consisting of alkylene oxides and halogen hydrines.

15. The composition of matter which comprises as an essential ingredient a reaction product obtainable by reacting upon a natural or synthetic ester-like wax with a nitrogenous base selected from the group consisting of ammonia, primary and secondary aliphatic, cycloaliphatic, araliphatic and aromatic amines, polyalkylene-polyamines containing at least one hydrogen atom connected to a nitrogen atom, and piperidine, and then raising the hydrotropical properties of the resulting compounds by condensing the same with a derivative of an aliphatic polyhydric alcohol of the group consisting of alkylene oxides and halogen hydrines; said reaction products represent wax-like, salvy or oily substances being soluble or easily dispersed in water and having good properties as softening, emulsifying, cleansing, wetting, washing, foaming and equalizing agents.

LUDWIG ORTHNER.
HELMUT KEPPLER.